Patented Oct. 12, 1926.

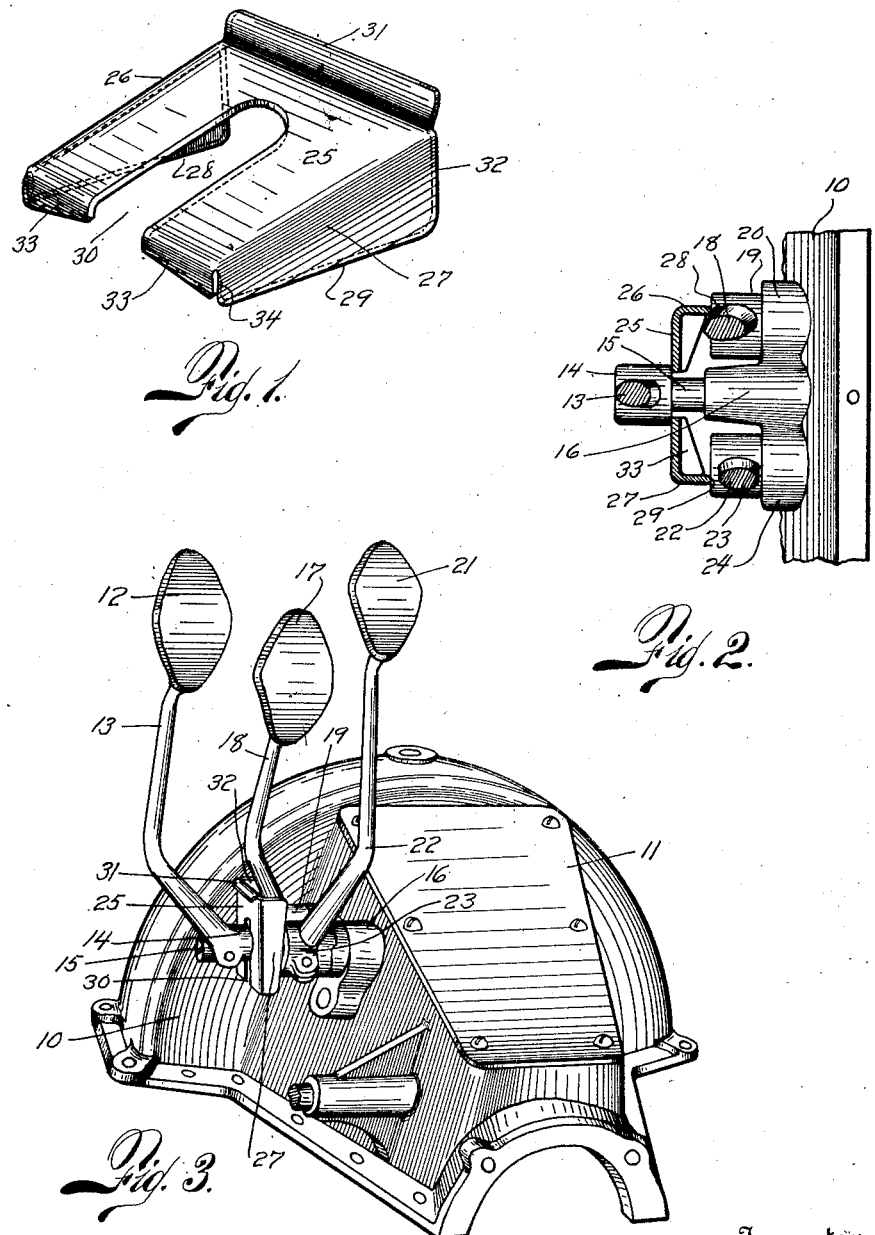

1,602,815

UNITED STATES PATENT OFFICE.

DAVID C. FEATHER, OF DENVER, COLORADO, ASSIGNOR TO IRA J. CLARK, OF DENVER, COLORADO.

AUTOMOBILE PEDAL-LOCKING WEDGE.

Application filed November 1, 1924. Serial No. 747,362.

This invention relates to work holders for assembling purposes, and the improvements particularly embody an automobile pedal locking wedge.

The primary object of the invention has been to devise a channel-like hollow wedging unit, which is of effective and durable although light-weight construction, which may be rapidly and economically manufactured, and which is so formed that, of itself or without auxiliary movable parts, it is adapted for the plural or conjoint temporary locking, in centralized positions, of all of the transmission band controlling pedals and their mounting shafts, associated with the transmission assembly of certain types of automobile engines, such as the well-known Ford transmission, for insuring the proper registration of parts and thereby greatly facilitating the otherwise troublesome replacing of the relatively heavy transmission cover assembly, when said cover assembly has been removed, as it is necessary to do, for the relining of the transmission bands or for other purposes.

Although the present invention relates only to pedal locking means itself, uniquely formed as a channel-like hollow integral wedging unit, in order to more readily understand its special utility, it may not be amiss to briefly state that the transmission bands, which encircle their respective drums, terminate in peripherally projected spaced lugs. These lugs are formed with end-opening slots, for the seating of their respective pedal operated shafts, and the said shafts are encompassed by coil springs extending between said lugs, the whole functioning in a manner well understood, and the said pedals, shafts and coil springs forming a part of the transmission cover assembly.

Also, it may not be amiss to further state that, in the actual use of my invention, although functioning independently, I preferably employ my pedal locking wedge in conjunction with certain other work holders, including a tool for holding all of said coil springs conjointly compressed and a clamping device for holding said slotted lugs conjointly in proper upright position, frequently heretofore done by a binding cord around the same, but these separate devices are not herein illustrated, as they do not form a part of the present invention itself, although they may be marketed and used therewith as parts of a work holding assembling set.

It follows, therefore, that with said lugs held properly aligned, and with said coil springs held compressed, then with my pedal locking wedge applied in position, as hereinafter disclosed, all of these annoyingly easily displaced parts are, in respective groups, held intimately locked in proper alignment, when the transmission cover assembly, as a whole, can facilely be replaced without any trouble and with much saving of time, as no obstruction is offered by unaligned parts.

With these prefacing remarks, generally outlining the object, nature and functioning of my present invention, reference will now be immediately had to the accompanying drawings, illustrating a practical embodiment of the improved device and its manner of application, in which drawings Figure 1 is an outside perspective view looking towards the apex end of the pedal locking wedge; Figure 2 is a transverse sectional view thereof as applied in its operative position, the pedal arms being also shown in cross-section; and Figure 3 is a rear perspective view of the transmission cover section and pedal assembly, with the pedal locking wedge illustrated in its operative position and the whole being ready for bodily replacing operations, excepting that the sloping door or top closure, which is illustrated in the view, would not in fact have been actually seated as yet, because the transmission cover section itself should preferably be first replaced in proper association with its lower section or crank case.

Referring to Figures 2 and 3, before actually describing the pedal locking wedge itself, the numeral 10 indicates the transmission cover section and 11 its removable top, or sloping door, that provides a closure for the drum housing chamber thereof, at one side wall of which latter there is disposed the boss-like construction which provides for the bearing supports 16, 20 and 24, respectively journaling the clutch pedal shaft 15, the reverse pedal shaft and the transmission brake pedal shaft. The clutch pedal is indicated at 12, its arm at 13 and the latter's shaft-clamping collar at 14, and corresponding elements of the reverse pedal assembly and the transmission brake pedal assembly are respectively indicated by the numerals 17—18—19 and 21—22—23.

The pedal locking wedge itself, being preferably of pressed steel construction, is formed from a properly cut blank of the metal, which blank is so finally shaped, by die-pressure, as to embody a main cross-wall or cross-web 25 that terminates longitudinally in tapering marginal flanges or wedge-shaped side-walls or side-webs 26 and 27, the tapering or beveled edge faces of which are respectively indicated at 28 and 29, and the said cross-web 25 having a central longitudinal slot 30 that opens through the apex end of the device, providing as it were a bifurcate or forked channel-body wedge.

At the base end of the device, the cross-web 25 is preferably formed with a forwardly projected or out-turned flange strip 31, in the nature of a laterally disposed elongated lip, which may be slightly curved inwardly, or of arcuate transverse section, to provide for a withdrawing handle or finger grip, under which the forefinger of the operator may conveniently be disposed.

The base end of the device is wholly open, as at 32, and also the space between all of the webs 25—26—27 is wholly open or unobstructed, whereby proper clearance space is provided for the lower angularly disposed portion of the reverse pedal arm 18.

At the apex end of the device, although perhaps not at all strictly essential, inturned transverse webs or flanges 33 may be formed, which are readily provided for by appropriate corner slits 34, and these are preferably employed as they afford both reinforcing or trussing means, for the forked or separated sections, and smooth-finished end-facing webs.

It will be seen from Figures 2 and 3 that, in applying my improved device in locking association with the pedal assembly, the slot 30 straddles the shaft 15 with the forward face of the web 25 in engagement with the inner end face of the clutch pedal's clamping collar 14, and with each of the tapering or beveled edge faces 28 and 29, of the side-webs 26 and 27, in direct wedging engagement with the respective inner end faces of the clamping collars 19 and 23 of the reverse pedal and the transmission brake pedal. It is further to be noted that in applying and detaching the locking wedge it is not necessary to adjust any auxiliary movable parts, but in applying the same the only one necessary operation is to force the hollow wedge down home, it being also observed that this may readily be done, owing to the unobstructed base end opening 32, and the space between the main cross-web 25 and the side webs 26 and 27, providing for the proper clearance to allow the hollow channel-like wedge to encompass the angularly disposed lower portion of the reverse pedal arm 18.

Thus there is provided therebetween a wedging interlock, as it were, and the several pedals may be properly centered and conjointly maintained firmly locked, as grouped assemblies, with this simple unitary device, in such desired centered position, for the facile replacement of the transmission cover as hereinbefore outlined.

What I claim, as new and patentable, is:—

1. A unitary pedal locking wedge, for the conjoint temporary holding of automobile pedal assemblies, embodying a main cross-web that terminates at its sides in longitudinally tapering rearwardly projected wedge-shaped side-webs, providing for a substantially unobstructed space therebetween, the said cross-web being provided with an elongated longitudinally disposed slot opening out through the apex end of the device.

2. A unitary pedal locking wedge, for the conjoint temporary holding of automobile pedal assemblies, embodying a main cross web that terminates at its sides in longitudinally tapering rearwardly projected wedge-shaped side-webs, providing for a substantially unobstructed space therebetween, and that terminates at its base end in a forwardly projected transverse flange strip, the said cross-web being provided with an elongated longitudinally disposed slot opening out through the apex end of the device.

3. A unitary pedal locking device, for the conjoint temporary holding of automobile pedal assemblies, comprising a pressed-steel channel-like hollow wedge, having an unobstructed open base, embodying a main cross-web that terminates at its sides in longitudinally tapering rearwardly projected wedge-shaped side-webs, also terminating at its base end in a forwardly projected transverse flange strip, and terminating at its apex end in rearwardly projected apex-webs extending approximately from the apex ends of said side-webs towards the center of said cross-web, the said cross-web being provided with an elongated longitudinally disposed slot, opening out through the apex end of said device terminally of the inner ends of said apex-webs.

In testimony whereof, I affix my signature.

DAVID C. FEATHER.